UNITED STATES PATENT OFFICE 2,570,878

GLASS COMPOSITIONS

John E. Stanworth and Alan E. Dale, Sheffield, England, assignors to General Electric Company, a corporation of New York No Drawing. Application November 19, 1949, Serial No. 128,505. In Great Britain November 25, 1948

5 Claims. (Cl. 106—54)

This invention relates to glass compositions possessing higher electrical conductivity than normal soda-lime glasses.

Glasses according to the present invention are composed of silica, boric oxide and lithia with an optional percentage of alumina, the percentage composition, by weight, being lithia 15–20, silica 20–65, boric oxide 10–50 and alumina up to 25.

We prefer to restrict the percentage of silica to a range of 30–55 and of the alumina to between 10 and 25, since glasses within this range of composition containing less than 30% of silica are less durable than is desirable, while a percentage of silica greater than 55 causes them readily to devitrify. The addition of alumina also increases the working range and renders the glasses less liable to devitrification.

As examples of glass compositions falling within the scope of the invention we give the following:

|  | $Li_2O$ | $SiO_2$ | $B_2O_3$ | $Al_2O_3$ | Log Resistivity (ohms per cc.) at 20° C. | at 100° C. |
|---|---|---|---|---|---|---|
|  | Per cent | Per cent | Per cent | Per cent |  |  |
| (I) | 20.0 | 49.0 | 25.4 | 5.6 | 9.2 | 7.3 |
| (II) | 17.2 | 38.2 | 30.6 | 14.0 | 10.0 | 8.0 |
| (III) | 18.7 | 46.8 | 14.0 | 20.5 | 9.0 | 7.1 |

All the above glass compositions possess thermal expansion coefficients similar to that of normal soda-lime glass, namely $90–100 \times 10^{-7}$. Their conductivities, compared with that of a soda-lime-silicate glass which has a log resistivity of about 12.0 at 20° C. and 10.0 at 100° C., are thus about 100 to 1000 times as great.

What we claim as new and desire to secure by Letters Patent of the United States is:

1. A glass having a high electrical conductivity and consisting, by weight, of 20 to 65 per cent silica, 10 to 50 per cent boric oxide, 15 to 20 per cent lithia and not more than 25 per cent alumina, said glass having an electrical conductivity 100 to 1000 times that of a corresponding glass containing sodium oxide in place of lithia.

2. A glass having a high electrical conductivity and consisting, by weight, of 30 to 55 per cent silica, 10 to 50 per cent boric oxide, 15 to 20 per cent lithia and 10 to 25 per cent alumina, said glass having an electrical conductivity 100 to 1000 times that of a corresponding glass containing sodium oxide in place of lithia.

3. A glass having a high electrical conductivity and consisting, by weight, of 49.0 per cent silica, 25.4 per cent boric oxide, 20.0 per cent lithia and 5.6 per cent alumina, said glass having a log resistivity of 1.2 ohms per cubic centimeter at 20° C.

4. A glass having a high electrical conductivity and consisting, by weight, of 38.2 per cent silica, 30.6 per cent boric oxide, 17.2 per cent lithia and 14.0 per cent alumina, said glass having a log resistivity of about 10 ohms per cubic centimeter at 20° C.

5. A glass having a high electrical conductivity and consisting, by weight, of 46.8 per cent silica, 14.0 per cent boric oxide, 18.7 per cent lithia and 20.5 per cent alumina, said glass having a log resistivity of 9 ohms per cubic centimeter at 20° C.

JOHN E. STANWORTH.
ALAN E. DALE.

REFERENCES CITED

The following references are of record in the file of this patent:

UNITED STATES PATENTS

| Number | Name | Date |
|---|---|---|
| 1,572,625 | Taylor | Feb. 9, 1926 |
| 2,433,882 | Armistead | Jan. 6, 1948 |
| 2,454,607 | Leberknight et al. | Nov. 23, 1948 |